(No Model.)

W. A. BOLE.
GOVERNOR.

No. 382,450. Patented May 8, 1888.

WITNESSES:
R. H. Whittlesey.
F. E. Gaither.

INVENTOR,
Wm. A. Bole.
By J. Snowden Bell,
Att'y.

UNITED STATES PATENT OFFICE.

WILLIAM A. BOLE, OF PITTSBURG, PENNSYLVANIA, ASSIGNOR TO THE WESTINGHOUSE MACHINE COMPANY, OF SAME PLACE.

GOVERNOR.

SPECIFICATION forming part of Letters Patent No. 382,450, dated May 8, 1888

Application filed January 10, 1888. Serial No. 260,323. (No model.)

*To all whom it may concern:*

Be it known that I, WILLIAM A. BOLE, a citizen of the United States, residing at Pittsburgh, in the county of Allegheny and State of Pennsylvania, have invented or discovered a certain new and useful Improvement in Governors, of which improvement the following is a specification.

My invention relates generally to mechanism having pivotal joints subject to centrifugal force, and more particularly to governors of the type in which a valve-operating eccentric or pin is varied in position through the action of centrifugal force to effect regulation of speed of an engine by variation of the point of cut-off; and its object is to admit of proper and sufficient lubrication of the pivots during long continuous runs, as well as to obviate waste of oil applied to said pivots by its discharge therefrom through centrifugal action.

To this end my invention, generally stated, consists in the combination of a pivot, a socket, and packings fitting around the ends of the pivot-bearing; also in the combination of a wheel or supporting-case, and a weight or weighted arm pivoted thereto and having an oil-chamber communicating with the bearing-surface of its pivot.

The improvement claimed is hereinafter more fully set forth.

Figure 1:
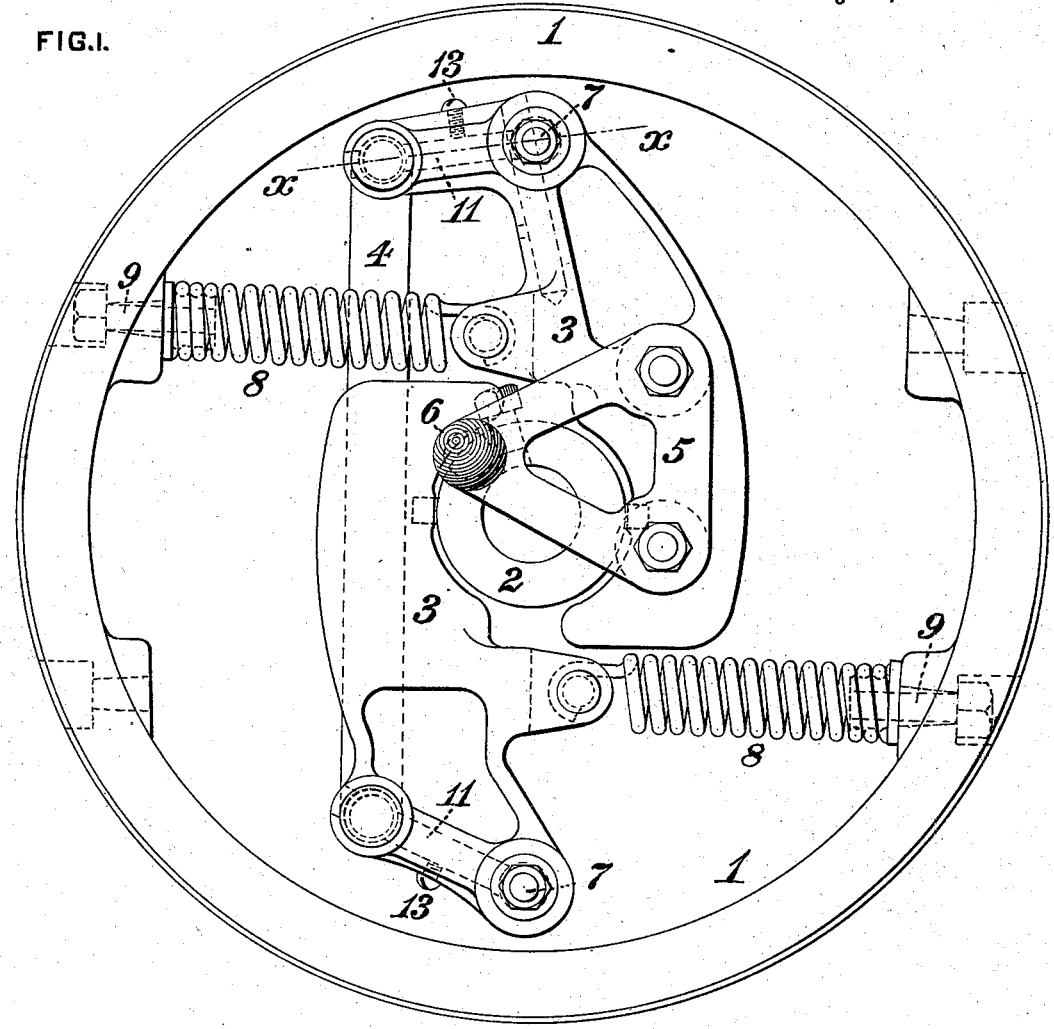
Figure 2:
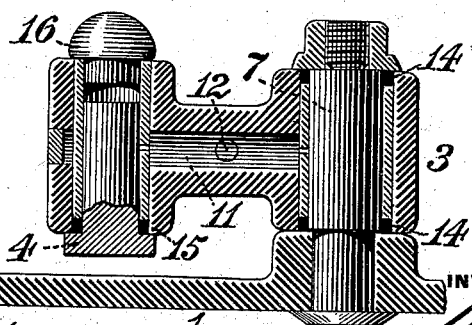

In the accompanying drawings, Figure 1 is a view in elevation of a governor embodying my invention; and Fig. 2, a transverse section, on an enlarged scale, through the same at the line *x x* of Fig. 2.

The governor, in which my invention is herein illustrated, accords in its general structural features with those of the same type heretofore employed, being composed of a wheel or supporting-case, 1, having a central hub or boss, 2, adapted to be secured upon the crank-shaft of an engine and carrying centrifugally-acting weights or weight-arms 3, which are coupled one to the other by a link, 4, and connected by a plate, 5, to a pin, 6, upon which is journaled an eccentric-rod by which the steam-distribution valve of the engine is operated. The weights 3 are, as in prior constructions, mounted upon and move freely about pivots 7, fixed in the case 1, on opposite sides of its center and adjacent to its periphery, and are coupled to springs 8, the opposite ends of which are connected by bolts 9, through which their tension may be adjusted as desired to the case 1. To admit of such free movement of the weights upon their pivots as is required for effective regulation, and obviate undue wear, it is essential that sufficient and continuous lubrication of the weight-pivots 7 and the pivots 10 of the connecting-link 4 should be provided for, and except under certain special constructions such lubrication has not heretofore been practicable, particularly in high-speed engines, without stoppages for the purpose, which stoppages, in many instances, would by reason of the duty of the engine be either inconvenient or wholly inadmissible. Further, even where the conditions are such that lubrication can be effected in the ordinary manner by intermittently supplying oil to the parts, the action of centrifugal force tends to a waste of the lubricant and an insufficient performance of its function by throwing it outwardly and away from the wearing-surfaces.

In order to enable the requisite lubrication of the weight and link pivots to be made without stoppage and obviate the liability to waste and insufficient lubrication above mentioned, I provide each of the weight-arms 3 with an oil chamber or receptacle, 11, which is preferably formed within the weight-arms, as shown, but may, if desired, be a separate piece connected thereto, said chambers communicating at their ends by small openings formed in the bushings of the weight-pivots 7 and link-pivots 4 with the bearing-surfaces of said pivots. Oil is supplied to the chambers 11 through openings 12, closed by removable plugs 13, and to prevent its escape from the surfaces in contact the ends of the pivot-sockets of the weights 3 are closed by annular washers or packings 14, of leather or other suitable yielding material. By the employment of said end washers sufficient oil for an ordinary run may be retained upon the wearing-surfaces without the employment of a special oil-chamber. Similar washers 15 are fitted between the shoulders of the link 4 and the adjacent ends of the bushings of the link-pivot sockets, the opposite ends of the bushings being preferably closed by shouldered or capped plugs 16, and packings, as above described, may be correspondingly applied to other pivotal connections in mechanisms exposed to the action of centrifugal force tending to cause the discharge of lubricating material—as, for example, in rapidly-revolving clutches, &c.,—and the link-connections of governors embodying a movable eccentric.

The capacity of the oil-chambers 11 is such as to admit of the reception of a sufficient quantity of oil for the lubrication of the pivots during as long a run as is ordinarily within the capacity of the engine, and escape of oil being prevented efficient lubrication is secured and waste correspondingly prevented.

I claim as my invention and desire to secure by Letters Patent—

1. In a centrifugal governor, the combination of a supporting-case, a weight or weighted arm pivoted thereto, and an oil-chamber fixed upon the weight and communicating with the bearing-surface of its pivot, substantially as set forth.

2. In a centrifugal governor, the combination of a supporting-case, a weight or weighted arm pivoted thereto, an oil-chamber fixed upon the weight and communicating with the bearing-surface of its pivot, and washers or packings fitting around said pivot at the ends of its bearing-surface, substantially as set forth.

3. In a centrifugal governor, the combination of a supporting-case, a pair of weights or weighted arms pivoted thereto, a link having end pivots fitting sockets in the weights, and oil-chambers fixed upon the weights and communicating with the bearing-surfaces of their pivots and of the pivots of the link, substantially as set forth.

In testimony whereof I have hereunto set my hand.

WILLIAM A. BOLE.

Witnesses:
J. SNOWDEN BELL,
W. B. CORWIN.